United States Patent
Taori et al.

(10) Patent No.: US 8,218,470 B2
(45) Date of Patent: Jul. 10, 2012

(54) RELAY FOR DETECTING ERROR IN ASYNCHRONOUSLY RECEIVED DATA AND MAP INFORMATION

(75) Inventors: Rakesh Taori, Gyeonggi-do (KR); Hyun Jeong Kang, Seoul (KR); Ki-Sun Oh, Gyeonggi-do (KR); Mi-Sun Do, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 922 days.

(21) Appl. No.: 12/105,565

(22) Filed: Apr. 18, 2008

(65) Prior Publication Data

US 2009/0022082 A1    Jan. 22, 2009

Related U.S. Application Data

(60) Provisional application No. 60/951,036, filed on Jul. 20, 2007.

(30) Foreign Application Priority Data

Nov. 6, 2007    (KR) .................. 10-2007-0112848

(51) Int. Cl.
  *H04B 7/14*    (2006.01)
  *H04B 7/02*    (2006.01)
  *H04W 4/00*    (2009.01)
(52) U.S. Cl. ........... 370/315; 370/338; 370/389; 455/39
(58) Field of Classification Search .......... 370/270–522; 455/7–555
  See application file for complete search history.

(56) References Cited

U.S. PATENT DOCUMENTS

| | | | |
|---|---|---|---|
| 6,342,777 B1 * | 1/2002 | Takahashi | 370/315 |
| 2006/0193286 A1 | 8/2006 | Naghian et al. | |
| 2007/0072604 A1 | 3/2007 | Wang | |
| 2007/0110016 A1 | 5/2007 | Shen et al. | |
| 2007/0153758 A1 | 7/2007 | Kang et al. | |
| 2009/0011705 A1 * | 1/2009 | Taori et al. | 455/39 |
| 2009/0201900 A1 * | 8/2009 | Suga | 370/338 |
| 2009/0219854 A1 * | 9/2009 | Okuda | 370/315 |

FOREIGN PATENT DOCUMENTS

| | | |
|---|---|---|
| KR | 2006-95139 | 8/2006 |
| KR | 2007-11030 | 1/2007 |
| KR | 2007-38651 | 4/2007 |

OTHER PUBLICATIONS

International Search Report issued in PCT/KR2008/002494 on Sep. 10, 2008.

* cited by examiner

*Primary Examiner* — Afsar M. Qureshi
(74) *Attorney, Agent, or Firm* — NSIP Law

(57) ABSTRACT

A relay to transmit data received from a transmitter to a receiver includes a reception unit to receive a first data frame including first data and a second data frame including first MAP information transmitted from a transmitter, and a determination unit to determine whether the received first data and first MAP information correspond to each other, and to determine that the reception unit has failed to receive second MAP information corresponding to the first data and second data corresponding to the first MAP information when the received first data and the first MAP information do not correspond to each other.

23 Claims, 5 Drawing Sheets

RELAY FOR DETECTING ERROR IN ASYNCHRONOUSLY RECEIVED DATA AND MAP INFORMATION

CROSS-REFERENCE TO RELATED APPLICATIONS

This application claims the benefit of U.S. Provisional Application No. 60/951,036, filed on Jul. 20, 2007, in the U.S. Patent and Trademark Office and Korean Application No. 2007-112848, filed on Nov. 6, 2007, in the Korean Intellectual Property Office, the disclosure of which is incorporated herein by reference.

BACKGROUND OF THE INVENTION

1. Field of the Invention

Aspects of the present invention relate to a relay, and more particularly, to a relay which transmits data received from a transmitter to a receiver.

2. Description of the Related Art

Demands for using various communication services, such as voice communication, video communication, data communication, and the like via radio communication networks, have been increasing. Video communication services and data communication services consume a relatively greater amount of radio resources between a transmitter and a receiver in comparison with voice communication services.

A transmission bandwidth of data transmitted via a radio link between the transmitter and the receiver is determined based on a state of the radio link. The state of the radio link may be unstable due to a fading phenomenon, and the like. The data transmission bandwidth between the transmitter and the receiver is restricted based on the state of the radio link. However, a band transmission bandwidth required to use the above-described communication services by respective receivers connected with the transmitter has been increasing. As the data transmission bandwidth transmitted to each receiver increases, a number of receivers capable of simultaneously communicating with a single transmitter decreases, and coverage of each transmitter decreases.

In order to overcome performance deterioration of a system to transmit radio data due to the fading phenomenon, a relay system to transmit data from the transmitter to the receiver via a relay has been suggested. The relay system transmits data from the transmitter directly to the receiver depending on a data transmission mode, or transmits data from the transmitter to the receiver via the relay. The relay system selects a relatively superior radio link from among radio links between the transmitter and the receiver and between the relay and the receiver, and then transmits data, thereby improving transmission efficiency.

The relay system assigns radio resources with respect to radio links between the relay and the receiver, and transmits data using the assigned radio resources. When the relay system transmits Mobile Application Part (MAP) information including information about the assigned radio resources to the receiver, the receiver then receives data corresponding to radio resource assignment information using the MAP information.

SUMMARY OF THE INVENTION

An aspect of the present invention provides a relay which detects errors generated in a process to receive data or MAP information corresponding to each other when the data and the MAP information are asynchronously received from a transmitter.

An aspect of the present invention provides a relay and a method to transmit, to a receiver, data or MAP information replacing data or MAP information failing to be received when the data and the MAP information are asynchronously transmitted from the transmitter and not received.

According to an aspect of the present invention, a relay includes a reception unit to receive a first data frame including first data and a second data frame including first MAP information transmitted from the transmitter, and a determination unit to determine whether the received first data and first MAP information correspond to each other, and to determine that the reception unit has failed to receive second MAP information corresponding to the first data and second data corresponding to the first MAP information when the received first data and first MAP information do not correspond to each other.

According to another aspect of the present invention, a method to forward data includes receiving a first data frame including first data transmitted from a transmitter, receiving a second data frame including first MAP information transmitted from the transmitter, determining whether the first data and the first MAP information correspond to each other, and determining that a relay has failed to receive second MAP information corresponding to the first data and second data corresponding to the first MAP information, when the first data and the first MAP information do not correspond to each other.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following detailed description of the embodiments, taken in conjunction with the accompanying drawings of which.

DETAILED DESCRIPTION OF THE EMBODIMENTS

Figure 1:
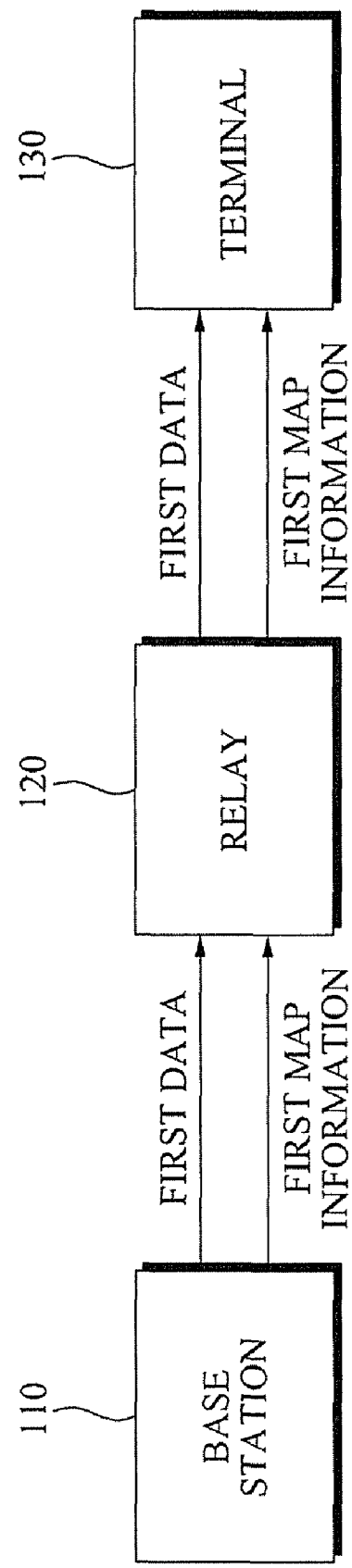
FIG. 1 is a diagram illustrating a data transmission system using a relay according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a data transmission system using a relay according to an embodiment of the present invention. Hereinafter, operations of a data transmission system using a relay according to an embodiment of the present invention will be described in detail with reference with FIG. 1.

The data transmission system includes a base station 110, a relay 120, and a terminal 130. The base station 110 transmits MAP information including information about a time when data is transmitted to the terminal 130. The terminal 130 receives data using the received MAP information.

Since the base station 110 transmits data intended to be transmitted to the terminal 130 to the terminal 130 via the relay 120, the relay 120 forwards the data and the MAP information corresponding to the data to the terminal 130. The MAP information is not information which is required to enable the relay 120 to receive data. However, it should be determined whether each unit of data corresponds to each unit of MAP information when the relay 120 receives a relatively large amount of data or MAP information.

When data and MAP information corresponding to the data are transmitted by the base station 110 with a predetermined temporal relation therebetween, the data and the MAP information are referred to as being synchronously transmitted with respect to each other. For example, the base station 110 classifies an entire amount of time required to transmit a single data unit as a predetermined length of time interval. When the data and the MAP information corresponding to each other are transmitted during an identical time interval in the case of transmitting data for each time interval, the data and the MAP information corresponding to each other are referred to as being synchronously transmitted. Also, the data and the MAP information are referred to as being asynchronously transmitted when the data and the MAP information corresponding to each other are transmitted during time intervals which are different from each other.

The base station 110 transmits the data and the MAP information corresponding to the data to the terminal 130 via the relay 120 when data is transmitted to the terminal 130 via the relay 120. Since the relay 120 does not receive data using the MAP information, the relay 120 may synchronously or asynchronously receive the data and the MAP information. According to an aspect of the present invention, the relay 120 binds the data and the MAP information, and synchronously transmits the bound data and MAP information to the terminal 130.

According to the present embodiment of the invention, the base station 110, the relay 120, and the terminal 130 transmit and receive data using a Media Access Control (MAC) data frame of a MAC hierarchy. In this case, the predetermined length of time interval may be understood as an amount of time required to transmit each MAC data frame. Also, the MAP information includes at least one of information of a time interval from a starting point of transmission of the MAC data frame to a starting point of transmission of the data corresponding to the MAP information, a length of a time interval during which the data corresponding to the MAP information is transmitted, or a combination thereof. It is understood that aspects of the present invention are not limited to transmitting and receiving MAC data frames, and may instead use various other types of data frames as well.

Data transmitted from the base station 110 to the terminal 130 is transmitted by being included in a burst within the MAC data frame. Hereinafter, it is assumed that the base station 110, the relay 120, and terminal 130 transmit and receive data using the MAC data frame of the MAC hierarchy, and this transmitting operation will simply be referred to as transmitting the data or MAP information using data frames.

The base station 110 transmits a first data frame including first data and a second data frame including first MAP information to the relay 120. The base station 110 enables first data-transmission time information associated with the first data to be included in the first data frame, and enables first MAP information-transmission time information associated with the first MAP information to be included in a second data frame. The base station 110 transmits the information included in the data frames to the relay 120.

The relay 120 determines whether the received first data and first MAP information correspond to each other. When the first data and the first MAP information do not correspond to each other, the relay 120 determines that the receiving of the second MAP information corresponding to the first data has failed, and also determines that the receiving of the second data corresponding to the first MAP information has failed. According to the embodiment of the invention, the relay 120 binds data and MAP information corresponding to each other based on information about a time during which data is transmitted from the relay 120 to the terminal 130 and information about a time during which MAP information is transmitted from the relay 120 to the terminal 130. However, it is understood that the relay 120 is not required to bind the data and MAP information corresponding to each other.

When the first data and the first MAP information correspond to each other, the relay 120 transmits the first data to the terminal 130 using the first MAP information. The first MAP information includes information about a time when transmission of the first data starts within a data frame used to transmit the first data corresponding to the first MAP information from the relay 120 to the terminal 130, information about a length of a time interval during which the first data is transmitted, or a combination thereof. According to an aspect of the invention, the first MAP information may further include an identifier of the terminal 130 which receives the first data corresponding to the first MAP information, in addition to or instead of the information about a time when transmission of the first data starts, the information about a length of a time interval during which the first data is transmitted, or the combination of the two types of information.

For convenience of description FIG. 1 illustrates the base station 110 and the terminal 130 to transmit and receive data, respectively. However, the base station 110 and the terminal 130 are exemplary only, and may instead be referred to as a transmitter to transmit user data and a receiver to receive the user data, respectively. Accordingly, the base station 110 and the terminal 130 may also be referred to as a transmitter 110 and a receiver 130, respectively, of a general data transmission system.

Furthermore, data may be transmitted from the terminal 130 to the base station 110 via the relay.

In FIG. 1, the transmitter 110 transmits the data and the MAP information to the receiver 130 via the single relay 120. However, according to other aspects of the invention, the transmitter 110 transmits the data and the MAP information to the receiver 130 via a plurality of relays 120. In this case, each relay may receive data and MAP information to transmit the data to the next relay, and bind data and MAP information corresponding to each other based on data transmission time information and MAP information transmission time information. In this case, each relay transmits data to the next relay using MAP information to the data.

Figure 2:
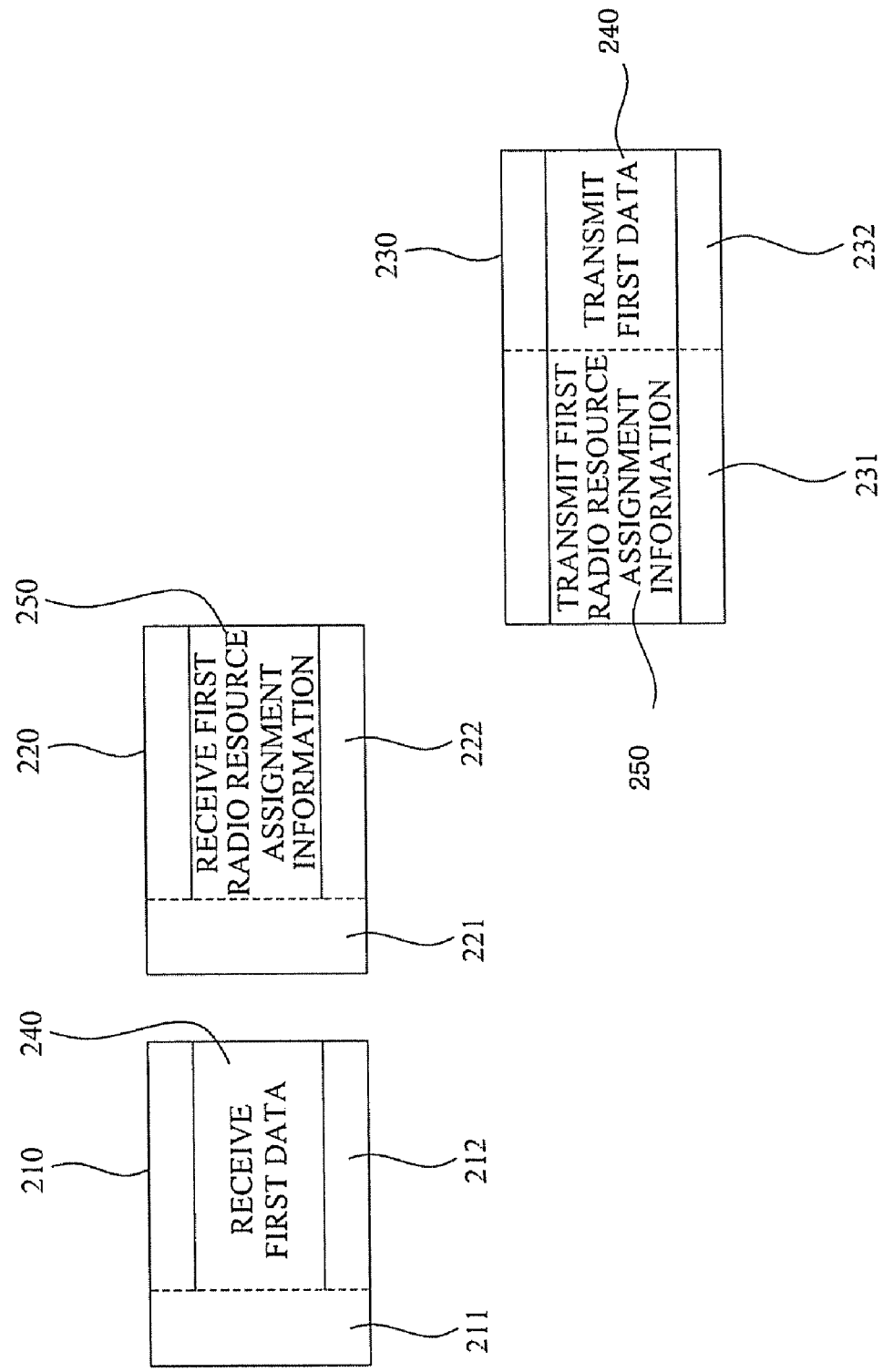
FIG. 2 is a diagram illustrating operations of a relay according to an embodiment of the present invention performed based on a data frame associated with the relay.

FIG. 2 is a diagram illustrating operations of a relay according to an embodiment of the present invention which are performed based on a data frame associated with the relay. Hereinafter, operations of the relay will be described in detail with reference to FIG. 2.

The relay 120 receives a first data frame 210 including received first data 240 and a second data frame 220 including received first MAP information 250 transmitted from the transmitter 110. The first data frame 210 and the second data frame 220 include control signal transmission regions 211 and 221 to transmit a control signal between the transmitter 110 and the relay 120, and data transmission regions 212 and 222 to transmit data. The first data 240 is transmitted from the transmitter 110 to the relay 120 using the data transmission region 212 within the first data frame 210. The first MAP information 250 is transmitted from the transmitter 110 to the relay 120 using the data transmission region 222 within the second data frame 220.

The first data 240 and the first MAP information 250 may correspond to each other, and the relay 120 transmits the first data 240 to the receiver 130 using the first MAP information 250. According to an aspect of the invention, a third data frame 230 includes a control signal transmission region 231 to transmit a control signal between the relay 120 and the receiver 130, and a data transmission region 232 to transmit data. The first MAP information 250 is transmitted to the receiver 130 by being included in the control signal transmission region 231 within the third data frame 230, and the first data 240 is transmitted to the receiver 130 by being included in the data transmission region 232 within the third data frame 230.

Figure 3:
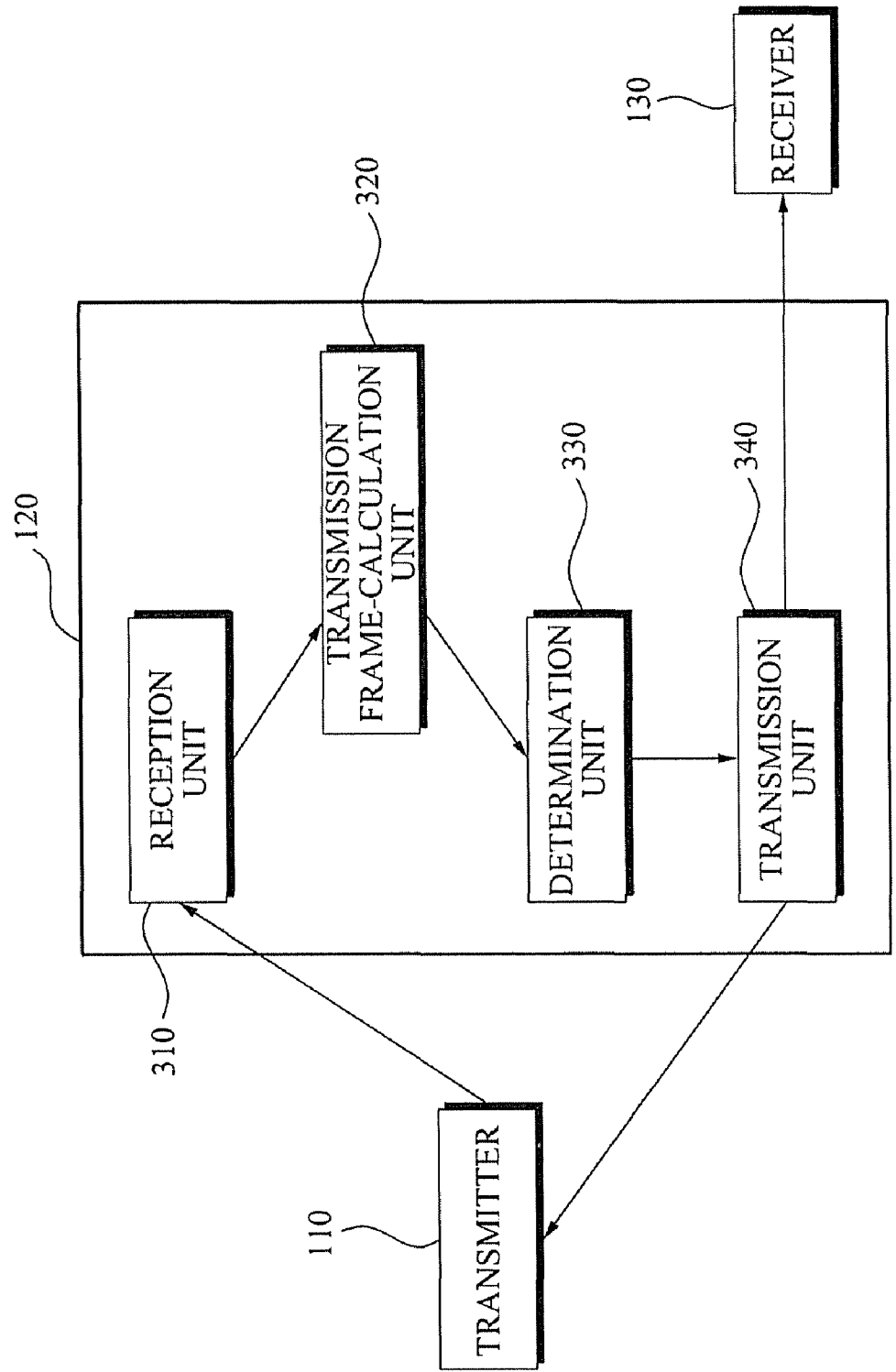
FIG. 3 is a block diagram illustrating a structure of the relay illustrated in FIG. 1.

FIG. 3 is a block diagram illustrating a structure of the relay 120 of FIG. 1. Hereinafter, the structure of the relay 120 will be described in detail with reference to FIG. 3. The relay 120 includes a reception unit 310, a transmission frame-calculation unit 320, a determination unit 330, and a transmission unit 340.

The reception unit 310 receives the first data frame 210 including first data 240 and a second data frame 220 including first MAP information 250, which are transmitted from the transmission unit 340. According to an aspect of the invention, the first MAP information 250 includes a time when transmission of data corresponding to the first MAP information 250 starts, or a length of a time interval during which the data corresponding to the first MAP information 250 is transmitted.

The determination unit 330 determines whether the received first data 240 and first MAP information 250 correspond to each other. When the received first data 240 and first MAP information 250 do not correspond to each other, the determination unit 330 determines that the relay 120 will not receive second MAP information corresponding to the first data 240 transmitted from the transmitter 110.

According to another embodiment of the invention, the reception unit 310 receives first data transmission time information associated with the first data 240 and first MAP information-transmission time information associated with the first MAP information 250, and the determination unit 330 determines whether the first data 240 and the first MAP information 250 correspond to each other based on the first data transmission time information and the first MAP information-transmission time information.

The first data transmission time information includes information about a time when the first data 240 is transmitted from the relay 120 to the receiver 130. The first MAP information-transmission time information includes information about a time when the first MAP information is transmitted from the relay 120 to the receiver 130. According to another embodiment of the invention, the determination unit 330 determines that the first data 240 and the first MAP information 250 correspond to each other when the first data 240 and the first MAP information 250 are transmitted from the relay 120 to the receiver 130 at the same time or similar times based on the first data transmission time information and the first MAP information-transmission time information. When the first MAP information 250 is transmitted from the relay 120 to the receiver 130 within a predetermined time interval before and after a time when the first data 240 is transmitted from the relay 120 to the receiver 130, the determination unit 330 determines that the first data 240 and the first MAP information 250 correspond to each other.

The transmission frame calculation unit 320 calculates, i.e., generates, the third data frame to transmit the first data 240 from the relay 120 to the receiver 130 and a fourth data frame to transmit the first MAP information 250 from the relay 120 to the receiver 130 based on the first data transmission time information and the first MAP information-transmission time information, respectively. The determination unit 330 determines that the first data 240 and the first MAP information 250 correspond to each other when the third data frame 230 and the fourth data frame are identical to each other, and binds the first data 240 and the first MAP information 250. According to an aspect of the present invention, the fourth data frame may be a substantially similar type of data frame as the third data frame 230 illustrated in FIG. 3.

According to an aspect of the invention, the first data transmission time information includes a data frame number of the third data frame 230, and the first MAP information-transmission time information includes a data frame number of the fourth data frame. According to another aspect of the invention, the first data transmission time information includes a predetermined length of Least Significant Bits (LSB) with respect to the data frame number of the third data frame 230 to transmit the first data 240 from the relay 120 to the receiver 130. A data frame number assigned to each data frame may be expressed as 32-bits or 64-bits, although is not limited thereto. When the transmitter 110 transmits the data transmission time information including the data frame number of, for example, 32-bits or 64-bits each time data is transmitted, radio resources with respect to radio links between the transmitter 110 and the relay 120 are wasted. A time difference between a time during which the relay 120 receives the first data frame 210 and a time during which the relay 120 transmits the third data frame 230 is not substantial and corresponds to a time length of merely several data frames. Thus, even when only the LSB are transmitted without transmitting all of the data frame numbers of the third data frame 230, the data frame number of the third data frame 230 may be easily calculated based on the data frame number of the first data frame 210.

The first MAP information-transmission time information may include a predetermined length of Least Significant Bits (LSB) with respect to a data frame number of the fourth data frame to transmit the first MAP information from the relay 120 to the receiver 130. Since the data frame number of the LSB is transmitted without transmitting all of the data frame numbers of, for example, 32-bits or 64-bits, radio resources with respect to radio links between the transmitter 110 and the relay 120 may be effectively used.

When the first data 240 and the first MAP information 250 correspond to each other, the transmission unit 340 transmits the first data 240 from the relay 120 to the receiver 130 using the first MAP information 250. The first MAP information 250 may include a time when transmission of the first data 240 corresponding to the first MAP information 250 starts within the third data frame 230 which is used to transmit the first data 240 from the relay 120 to the receiver 130, or a length of a time interval during which the first data 240 is transmitted within the third data frame 230, and the transmission unit 340 may transmit the first data 240 from the relay 120 to the receiver 130 by referring to the information about the time when transmission of the first data 240 starts within the third data frame 230, or the length of the time during which the first data 240 is transmitted. The first MAP information 250 may include an identifier of the receiver 130 which receives the first data 240, and the transmission unit 340 may transmit the first data 240 by referring to the identifier of the receiver 130.

According to an aspect of the present invention, when the first data and the first MAP information correspond to each other, the transmission unit 340 transmits a Negative Acknowledgment (NACK) message with respect to the first data 240 and the first MAP information 250 from the relay 120 to the transmitter 130. When the first data 240 and the first MAP information 250 do not correspond to each other, the transmission unit 340 transmits the NACK message with respect to second MAP information or second data. It is understood that the second data and the second MAP information may be embodied as substantially similar to the first data 240 and the first MAP information 250.

When the first data 240 and the first MAP information 250 do not correspond to each other, the determination unit 330 determines that a reception unit 310 has failed to receive the second MAP information corresponding to the first data 240. Also, the determination unit 330 determines that the reception unit 310 has failed to receive the second data corresponding to the first MAP information 250.

The transmission unit 340 transmits the NACK message with respect to the second MAP information determined as failing to be received, and the transmitter 110 re-transmits second MAP information and second MAP information-transmission time information associated with the second MAP information to the relay 120 in response to the transmitted NACK message. The relay 120 determines whether the second MAP information corresponds to the first data 240 using the re-transmitted second MAP information-transmission time information, and transmits the first data 240 to the receiver 130 using the second MAP information according to the determination results.

According to an aspect of the invention, the transmission unit 340 transmits the NACK message with respect to the second data which is determined as failing to be received to the transmitter 110, and the transmitter 110 re-transmits second data and second data transmission time information associated with the second data to the relay 120, in response to the transmitted NACK message. The relay 120 determines whether the second data and the first MAP information 250 correspond to each other using the re-transmitted second data transmission time, and transmits the second data to the receiver 130 using the first MAP information 250 according to the determination results.

According to an aspect of the invention, when the determination unit 330 determines that the reception unit 310 has failed to receive the first MAP information 250, the transmitter 340 transmits an ignore message to the receiver 130 with respect to the second data corresponding to the first MAP information 250. The receiver 130 does not receive data with respect to radio resources corresponding to the ignore message.

When the determination unit 330 determines that the reception unit 310 has failed to receive the second data, the transmission unit 340 does not transmit the second data to the receiver 130. The receiver 130 does not receive the second data, and all operations to receive data using radio resources corresponding to the second data are useless. In order to prevent unnecessary power consumption and effectively use a bandwidth with respect to radio links between the relay 120 and the receiver 130, the relay 120 transmits the ignore message with respect to the second data to the receiver 130. The receiver 130 does not receive data with respect to radio resources corresponding to the second data according to the transmitted ignore message.

According to an aspect of the invention, the ignore message with respect to the second data is a Gap downlink burst profile message or a message corresponding thereto. The Gap downlink burst profile message indicates that no data has been transmitted from radio resources corresponding to the Gap downlink burst profile message. The receiver 130 receiving the Gap downlink burst profile message does not receive data with respect to the radio resources corresponding to the Gap downlink burst profile message. When the determination unit 330 determines that the reception unit 310 has failed to receive the second data, the transmission unit 340 transmits the Gap downlink burst profile message to the receiver 130. The receiver does not receive data with respect to the radio resources corresponding to the Gap downlink burst profile message depending on the Gap downlink burst profile message.

According to another aspect of the present invention, the ignore message with respect to the second data may be a Space-Time Coding/downlink (STC/DL) zone switch message or a message corresponding thereto. The STC/DL zone switch message denotes that either a specific substitute mode or a transmission diversity mode is applicable to the radio resources corresponding to the STC/DL zone switch message. It is determined whether the receiver 130 receiving the STC/DL zone switch message corresponds to a receiver of the radio resources corresponding to the STC/DL zone switch message. The receiver 130 does not receive the radio resources corresponding to the STC/DL zone switch message when the receiver 130 does not correspond to a receiver of the radio resources. To ensure that the receiver, which does not correspond to the receiver of the radio resources corresponding to the STC/DL zone switch message, does not perform an incorrect channel estimation with respect to the radio resources, the transmitter 110 may transmit the STC/DL zone switch message setting a dedicated pilot.

When the determination unit 330 determines that the reception unit 310 fails to receive the second data, the transmission unit 340 transmits the STC/DL zone switch message to the receiver 130. The receiver does not receive any data with respect to the radio resources corresponding to the STC/DL zone switch message depending on the STC/DL zone switch message.

According to an aspect of the invention, when the determination unit 330 determines that the reception unit 310 fails to receive the second data, the determination unit 330 eliminates the identifier of the receiver 130 included in the first MAP information 250 corresponding to the second data. The receiver 130 initially receives the first MAP information 250 corresponding to the second data, and then receives the second data using the radio resources associated with the first MAP information 250 when the identifier of the receiver 130 is included in the first MAP information 250. When the reception unit 310 fails to receive the second data, the transmission unit 340 does not transmit the second data to the receiver 130. Thus, all operations of the receiver 130 to receive the second data are useless. When the determination unit 330 eliminates the identifier of the receiver 130 included in the first MAP information 250, since the identifier of the receiver 130 receiving the first MAP information 250 is not included in the first MAP information 250, the receiver 130 does not receive the second data corresponding to the first MAP information 250.

According to an aspect of the invention, when the determination unit 330 determines that the reception unit 310 has failed to receive the second data, the transmission unit 340 enables the first MAP information 250 to include an identifier of the relay 120 or an identifier of a second receiver not connected with the transmitter, to thereby transmit the included identifiers. In the situation when an identifier of the receiver 130 is not included in the first MAP information 250, a user may pre-set the receiver 130 to receive the second data using the first MAP information 250. When the identifier of the relay 120 is included in the first MAP information 250 to thereby be transmitted, or when the identifier of a second receiver not connected with the transmitter 110 is included in the first MAP information 250 to thereby be transmitted, the receiver 130 receiving data is prevented from receiving the second data using the first MAP information 250 where the identifier of the specific receiver 130 is not included.

When the determination unit 330 determines that the reception unit 310 fails to receive the second data, the transmission unit 340 transmits third data to the receiver 130 instead of transmitting the second data to the receiver 130. The third data is set so as to enable the receiver 130 to detect errors. The receiver 130 receives the third data, and transmits a NACK message to the relay 120 with respect to the third data. The relay 120 may transmit a NACK message to the transmitter 110 with respect to the second data instead of the NACK message with respect to the third data. The transmitter 110 re-transmits the second data and third MAP information corresponding to the re-transmitted second data to the relay 120, in response to the NACK message with respect to the second data. The relay 120 transmits the re-transmitted second data to the receiver 130 using the third MAP information. It is understood that the third data and the third MAP information may be embodied as substantially similar to the first data 240 and the first MAP information 250.

According to an aspect of the invention, each bit composing the third data, which is set so as to enable the receiver 130 to detect errors, may be set in such a manner so that all the bits are the same value. When the relay 120 transmits third data to the receiver 130 in which each bit composing the third data is a '1 or '0,' and each bit composing the received third data is all the same, it is determined that errors have occurred in the third data.

Each bit composing the third data may have an arbitrarily generated value. When each bit composing the third data has an arbitrarily generated value which is different from '1 or '0,' such as, for example, 0.5, the third data is similar to noise. The receiver 130 receiving the third data similar to noise determines that an error has occurred with respect to the third data.

When the determination unit 330 determines that the reception unit 310 has failed to receive the second data, the transmission unit 340 does not transmit the second data to the receiver 130. According to aspects of the invention, the relay 120 does not artificially manipulate the second data which has failed to be received, or does not transmit the third data capable of replacing the second data to the reception unit 130. This is called as a drop mode. In the drop mode, when the determination unit determines that the reception unit 310 fails to receive the second data, the transmission unit 340 enables only MAP information normally received to be included in the third data frame, to thereby transmit the included information to the receiver 130.

When the determination unit 330 determines that the reception unit 310 has failed to receive the second MAP information, the transmission unit 340 does not transmit any data.

Figure 4:
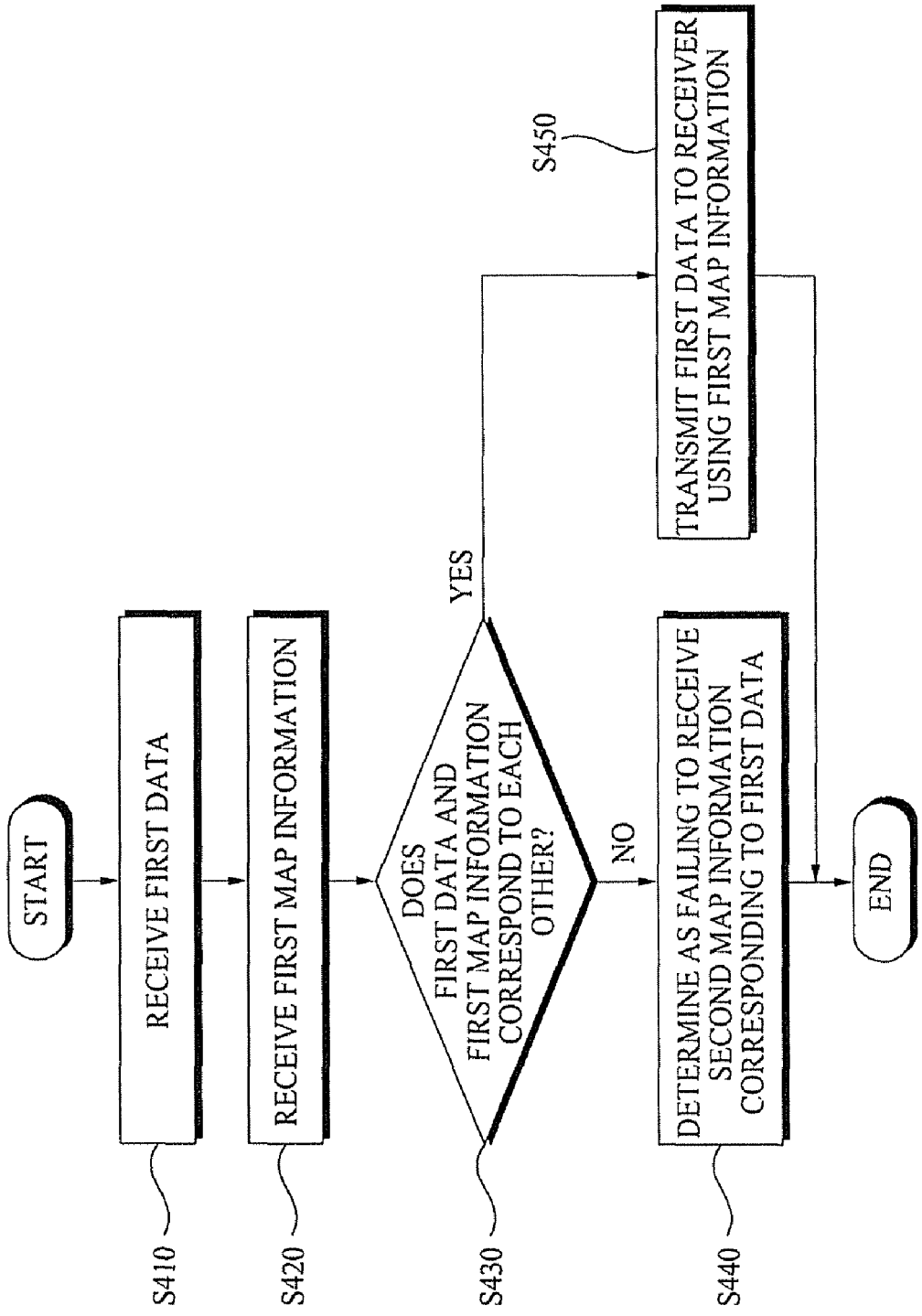
FIG. 4 is a flowchart illustrating a method to forward data according to an embodiment of the present invention.

FIG. 4 is a flowchart illustrating a method to forward data according to an embodiment of the present invention. Hereinafter, the method to forward data will be described in detail with reference to FIG. 4.

In operation S410, a first data frame including first data 240 (FIG. 2) is received. In operation S420, a second data frame including first MAP information 250 (FIG. 2) is received. According to an aspect of the present invention, in operation S410, first data-transmission time information including information about a time when the first data 240 is transmitted from the relay 120 to the receiver 130 is included in the first data frame to thereby be received, and in operation S420, first MAP information-transmission time information including information about a time when the first MAP information 250 is transmitted from the relay 120 to the receiver 130 is included in the second data frame to thereby be received.

In operation S430, it is determined whether the first data 240 and the first MAP information 250 correspond to each other. According to an aspect of the invention, it is determined whether the first data 240 and the first MAP information 250 correspond to each other based on the first data transmission time information and the first MAP information-transmission time information. However, it is understood that other aspects of the present invention are not limited to determining whether the first data 240 and the first MAP information 250 correspond to each other based on the first data transmission time information and the first MAP information-transmission time information.

When the first data 240 and the first MAP information 250 do not correspond to each other, it is determined in operation S440 that a failure has occurred in receiving second data corresponding to the first MAP information 240. Otherwise, when the first data 240 and the first MAP information 250 correspond to each other according to the determination in operation S430, the first data 240 is transmitted to the receiver 130 using the first MAP information 250 in operation S440.

Figure 5:
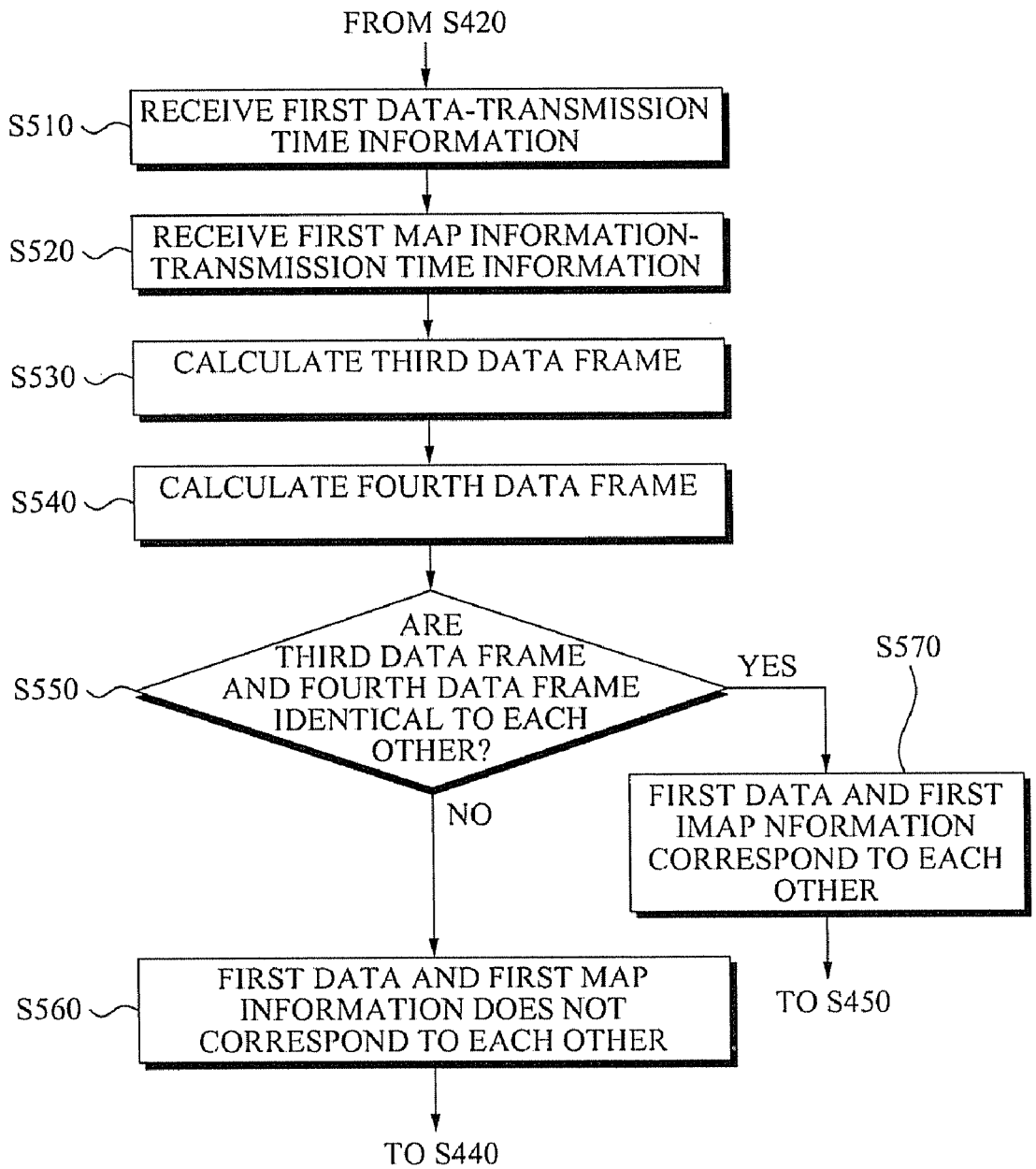
FIG. 5 is a flowchart illustrating a method to determine whether data and MAP information correspond to each other based on data transmission time information and MAP information transmission time information according to an embodiment of the present invention.

FIG. 5 is a flowchart illustrating a method to determine whether data and MAP information correspond to each other based on data transmission time information and MAP information transmission time information according to an embodiment of the present invention. Hereinafter, the method to determine whether data and MAP information correspond to each other will be described in detail with reference to FIG. 5.

In operation S510, first data transmission time information is received. According to an aspect of the present invention, the first data transmission time information is included in the first data frame 210 to thereby be received.

In operation S520, first MAP information-transmission time information is received. According to an aspect of the present invention, the first MAP information-transmission time information is included in a second data frame 220 to thereby be received.

In operation S530, a third data frame 230 to transmit the first data 240 to the receiver 130 is calculated based on the first data transmission time information.

In operation S540, a fourth data frame to transmit the first MAP information 240 to the receiver 130 is calculated based on the first MAP information transmission time information. According to an aspect of the present invention, the first data transmission time information includes a frame number of the third data frame 230, and the first MAP information-transmission time information includes a frame number of the fourth data frame. According to an other aspect of the invention, the first data transmission time information includes a predetermined length of LSB from among frame numbers of the third data frame 230, and the first MAP information-transmission time information includes a predetermined length of LSB from among frame numbers of the fourth data frame.

In operation S550, it is determined whether the third data frame 230 and the fourth data frame are identical to each other.

When the third data frame and the fourth data frame are identical to each other, it is determined that the first data 240 and the first MAP information 250 correspond to each other in operation S560.

When the third data frame 230 and the fourth data frame are different from each other, it is determined that the first data 240 and the first MAP information 250 do not correspond to each other in operation S570. When the first data 240 and the first MAP information 250 do not correspond to each other, it is determined that a failure has occurred in receiving the second MAP information corresponding to the first data 240 and the second data corresponding to the first MAP information 250.

According to an aspect of the present invention, when it is determined the receiving of the second MAP information has failed, an operation to transmit an ignore message to the receiver 130 (FIG. 3) with respect to the first data 240 corresponding to the second MAP information is further included. When the receiver 130 receives the ignore message with respect to the first data 240, the receiver 130 does not receive data using a radio resource corresponding to the first data 240.

According to an aspect of the present invention, when it is determined that the receiving of the second data has failed, an operation to eliminate an identifier of the receiver 130 included in the first MAP information 250 associated with the second data, and an operation to transmit the second data to the receiver 130 using the first MAP information 250, are further performed. The receiver 130 first receives the first MAP information 250, and receives the second data corresponding to the first MAP information 250 using the first MAP information 250 when the identifier of the receiver 130 is included in the first MAP information 250. When the identifier of the receiver 130 included in the first MAP information 250 is eliminated, the receiver 130 is prevented from receiving the second data.

When it is determined that the receiving of the second data has failed, an operation to enable the first MAP information 250 corresponding to the second data to include an identifier of the relay 120 or an identifier of a second receiver not connected with the transmitter 110, and an operation of transmitting the first MAP information 250 with the included information, are further performed.

When a plurality of receivers are enabled to receive the first MAP information 250, one of the receivers may be pre-set to be a default receiver to receive the second data corresponding to the first MAP information 250 when the first MAP information 250 does not include an identifier of a specific receiver. When the first MAP information 250 includes the identifier of the relay 120 or the identifier of the second receiver not connected with the transmitter 110 to thereby transmit the included identifiers, the receiver 130 to receive the first MAP information 250 is prevented from receiving the second data.

When it is determined that the receiving of the second data has failed, an operation to transmit third data, instead of the second data which is not received by the relay 120, to the receiver 130 is performed. In this instance, the third data is set so as to enable the receiver 130 to detect errors.

The receiver 130 detects errors with respect to the third data, and transmits a NACK message to the relay 120. The receiver 130 transmits a NACK message to the transmitter 110 indicating that the second data is different from the third data, and the transmitter re-transmits the second data to the relay 120 in response to the NACK message.

The above-described embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of accomplishing aspects of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, it would be appreciated by those skilled in the art that changes may be made to these exemplary embodiments without departing from the principles and spirit of the invention, the scope of which is defined by the claims and their equivalents.

What is claimed is:

1. A relay, comprising:
   a reception unit configured to receive, from a base station or an upper relay, at least one data frame including data and Mobile Application Part (MAP) information; and
   a determination unit configured to:
      determine whether the data and the MAP information correspond to each other; and
      determine that an error in the reception of the data or the MAP information occurs in response to the data and the MAP information not corresponding to each other.

2. The relay of claim 1, wherein:
   the at least one data frame comprises data-transmission time information associated with the data and MAP information-transmission time information associated with the MAP information; and
   the determination unit is further configured to determine whether the data and the MAP information correspond to each other, based on the data-transmission time information and the MAP information-transmission time information.

3. The relay of claim 2, wherein the data-transmission time information comprises a predetermined length of Least Significant Bits (LSB) with respect to a frame number of the data frame.

4. The relay of claim 2, wherein the MAP information-transmission time information comprises a predetermined length of LSB with respect to a frame number of the data frame.

5. The relay of claim 1, further comprising:
a data frame-calculation unit configured to calculate a transmission data frame transmitting the data or the MAP information to a lower relay or a terminal, the transmission data frame comprising the data or the MAP information,
wherein the determination unit is further configured to determine that the data and the MAP information correspond to each other, in response to the data and the MAP information each included in the transmission data frame corresponding to each other.

6. The relay of claim 1, further comprising a transmission unit configured to transmit, to the base station or the upper relay, a No Acknowledgement (NACK) message with respect to the data or the MAP information, in response to the data and the MAP information not corresponding to each other based on the determined result of the determination unit.

7. The relay of claim 1, wherein the MAP information comprises at least one of a time when transmission of the data starts within the data frame, a length of a time interval during which the data is transmitted, and an identifier of a lower relay or a terminal where the data is transmitted.

8. The relay of claim 1, further comprising a transmission unit configured to transmit, to a lower relay or a terminal where the data is transmitted, an ignore message with respect to the data, in response to the error in the reception of the MAP information occurring based on the determined result of the determination unit.

9. The relay of claim 8, wherein the ignore message comprises a GAP downlink burst profile message.

10. The relay of claim 8, wherein the ignore message comprises a Space-Time Coding/downlink (STC/DL) Zone Switch message.

11. The relay of claim 1, wherein, in response to the error in the reception of the data occurring based on the determined result of the determination unit, the determination unit is further configured to eliminate an identifier of a lower relay or a terminal included in the MAP information.

12. The relay of claim 1, further comprising a transmission unit configured to transmit an identifier of the relay or an identifier of another relay or another terminal each not being connected with the base station or the upper relay by enabling the identifier of the relay or the identifier of the other relay or the other terminal to be included in the MAP information, in response to the error in the reception of the data occurring based on the determined result of the determination unit.

13. The relay of claim 1, further comprising a transmission unit configured to transmit, to a lower relay or a terminal, replacement data determined to enable a receiver to detect an error in replacement of the data, in response to the error in the reception of the data occurring based on the determined result of the determination unit.

14. The relay of claim 13, wherein the replacement data comprises bits having the same values or randomly generated values.

15. The relay of claim 1, wherein the data and the MAP information do not correspond to each other.

16. A data transmission method of a relay, comprising:
receiving, from a base station or an upper relay, at least one data frame comprising data and Mobile Application Part (MAP) information; and
determining whether the data and the MAP information correspond to each other, and determining that an error in the reception of the data or the MAP information occurs in response to the data and the MAP information not corresponding to each other.

17. The data transmission method of claim 16, wherein:
the at least one data frame comprises data-transmission time information associated with the data and MAP information-transmission time information associated with the MAP information; and
the determining determines whether the data and the MAP information correspond to each other, based on the data-transmission time information and the MAP information-transmission time information.

18. The data transmission method of claim 16, further comprising transmitting, to the base station or the upper relay, an NACK message with respect to the data or the MAP information, in response to the data and the MAP information not corresponding to each other based on the determined result of the determining.

19. The data transmission method of claim 16, further comprising transmitting, to a lower relay or a terminal where the data is transmitted, an ignore message with respect to the data, in response to the error in the reception of the MAP information occurring based on the determined result of the determining.

20. The data transmission method of claim 16, further comprising eliminating an identifier of a lower relay or a terminal included in the MAP information, in response to the error in the reception of the data occurring based on the determined result of the determining.

21. The data transmission method of claim 16, further comprising transmitting an identifier of the relay or an identifier of another relay or another terminal each not being connected with the base station or the upper relay by enabling the identifier of the relay or the identifier of the other relay or the other terminal to be included in the MAP information, in response to the error in the reception of the data occurring based on the determined result of the determining.

22. The data transmission method of claim 16, further comprising transmitting, to a lower relay or a terminal, replacement data determined to enable a receiver to detect an error in replacement of the data, in response to the error in the reception of the data occurring based on the determined result of the determining.

23. The data transmission method of claim 16, wherein the data and the MAP information do not correspond to each other.

* * * * *